(12) United States Patent
Breit et al.

(10) Patent No.: US 6,468,058 B1
(45) Date of Patent: Oct. 22, 2002

(54) SUBMERSIBLE CONCATENATED SYSTEM

(75) Inventors: Stephen M. Breit, Edmond, OK (US); O. Howard Glaze, Houston, TX (US)

(73) Assignee: Wood Group ESP, Inc., Oklahoma City, OK (US)

( * ) Notice: Subject to any disclaimer, the term of this patent is extended or adjusted under 35 U.S.C. 154(b) by 2 days.

(21) Appl. No.: 09/621,206

(22) Filed: Jul. 21, 2000

Related U.S. Application Data (60) Provisional application No. 60/144,967, filed on Jul. 21, 1999.

(51) Int. Cl.[7] ................................................. F04B 17/00
(52) U.S. Cl. ................................ 417/423.3; 417/423.6; 417/423.7
(58) Field of Search .......................... 417/423.3, 423.6, 417/423.7, 424.2; 310/112, 113, 114, 103–110

(56) References Cited

U.S. PATENT DOCUMENTS

| | | | |
|---|---|---|---|
| 2,406,959 A | * | 9/1946 | Millard ........................ 103/87 |
| 3,578,998 A | | 5/1971 | Euerle |
| 5,077,509 A | | 12/1991 | Wilson |
| 5,254,894 A | | 10/1993 | Satake |
| 5,293,518 A | | 3/1994 | Wilson |
| 5,384,520 A | | 1/1995 | Yang |
| 5,420,486 A | | 5/1995 | Wilson |
| 5,784,923 A | | 7/1998 | Kuehnle |
| 5,898,287 A | | 4/1999 | Roberti et al. |
| 5,929,575 A | | 7/1999 | Hyodo |
| 6,056,511 A | * | 5/2000 | Kennedy et al. .............. 417/53 |
| 6,091,175 A | * | 7/2000 | Kinsinger .................... 310/90 |
| 6,167,965 B1 | | 1/2001 | Bearden et al. |
| 6,254,353 B1 | | 7/2001 | Polo et al. |
| 6,326,713 B1 | | 12/2001 | Judson |
| 6,335,871 B1 | | 1/2002 | Kita et al. |

* cited by examiner

*Primary Examiner*—Charles G. Freay
*Assistant Examiner*—William H Rodriguez
(74) *Attorney, Agent, or Firm*—Crowe & Dunlevy (57) ABSTRACT

A system for pumping fluid from a well-bore that includes a pump assembly driven by a first motor module assembly via a continuous rotatable shaft. The first motor module assembly includes an induction motor having a multi-phase stator and a wound rotor. Energizing the stator of the induction motor of the first motor module induces a current in the windings of the wound rotor of the induction motor of the first motor module. The induced current is supplied to a motor coupling unit which generates power to drive a second motor module assembly electrically connected to the motor coupling unit. The second motor module assembly further drives the pump assembly via the continuous rotatable shaft.

14 Claims, 7 Drawing Sheets

SUBMERSIBLE CONCATENATED SYSTEM

RELATED APPLICATIONS

This application claims priority to U.S. Provisional Application No. 60/144,967 filed Jul. 21, 1999.

BACKGROUND OF INVENTION

Field of Invention

The present invention relates to the field of pumps and motors, and more particularly but not by way of limitation, to an improved submersible pump and motor system that includes a concatenated pump system for lifting fluid in oil and gas wells.

Discussion

A variety of systems are used to bring fluids from below ground to the surface in a well when the pressure is insufficient or it is beneficial for other reasons. One common method involves using a pumping system to draw fluids from the producing formation(s) to the surface for collection and processing. In one class of pumping systems, a submersible pumping unit is immersed in the well-bore fluids and driven to force fluids through production tubing to the earth's surface. Such pumping systems typically include an electric submersible motor (ESM), a submersible production pump with sealing portions to protect the motor from well-bore fluids, a gearbox, and a variety of other controls such as a variable speed drive (VSD).

In many pumping systems, centrifugal pumps are used but centrifugal pumps are not adequate in a number of circumstances. In particular centrifugal pumps are typically inefficient at the lower pump speeds. Alternatives to centrifugal pumping systems include positive displacement pumping systems, such as a progressive cavity pumping systems (PCS). During a start-up phase of the pumping system a higher torque is needed from a motor portion of the pumping system to drive the progressive pump portion of the pumping system. In order to provide the higher torque required at start-up, and to speed match the motor to the operating range of the progressive cavity pump portion of the system, the progressive cavity pumping system usually includes a gear reducer for increasing motor output torque and speed matching. Typically, such gear reducers are positioned within the well-bore and thus are size constrained. These gear reducers also operate at speeds determined by a fixed ratio of the output speed of the motor, so motors of the progressive cavity pumping system generally need to be coupled with a variable speed driver to effect operation of the prior art progressive cavity pumping system over a range of speeds. Even when a variable speed drive is used, the gear reducers limit the range of speeds for operating the progressive cavity pump portion of a progressive pumping system, typically making higher production rates unavailable. Thus prior art progressive cavity pumping systems ordinarily fail to afford the flexibility necessary to pump fluids at both low and high flow rates.

Within a typical prior art progressive cavity pumping system, a motor coupled to a variable speed drive exhibits decreasing torque in response to an input from the variable speed drive for a lower rotational speed and show significant decreases in available torque for current supplied at frequencies below 30 Hertz. Additionally, the maximum torque transfer of a gearbox assembly within a typical prior art progressive cavity pumping system is limited by the gearbox size, specifically an available diameter for the gears of the gearbox; thus a well-bore diameter often limits the available horsepower of a typical prior art progressive cavity pumping system. Within a typical well-bore, the available horsepower of most progressive cavity pumping systems equipped with a gearbox and operating under a variable speed drive is limited to about 80 horsepower. Furthermore, the inclusion of a gearbox and a variable speed drive in a prior art progressive cavity pumping system add significantly to the cost of the system.

Variable speed drives (VSD) are often used in conjunction with a gearbox within a prior art progressive cavity pumping system to achieve a wider operating speed range but an alternative method is to use the VSD directly with an ESM to run the motor in a controlled low speed operation. However, a prior art progressive cavity pumping system with a variable speed drive coupled directly to a motor of the system typically has a limiting starting torque, which often proves to be insufficient for a system utilizing a progressive cavity pump that requires a starting torque of nearly 145% of the running torque of the system. Also, a prior art progressive cavity pumping system configured with a variable speed drive coupled directly to an electric submersible motor is horsepower limited and non-applicable to a number of submersible applications.

Therefore, challenges remain and a need persists for a cost competitive, progressive cavity pumping system compliant with high torque start-up demands placed on the system, while providing improved reliability for steady state operation of the pumping system.

SUMMARY OF INVENTION

As exemplified by preferred embodiments, the present invention provides a concatenated pump system that includes a pump assembly driven by a first motor module, which also generates power supplied through a motor coupling unit to a second motor module assembly that further drives the pump assembly. The first motor module assembly, second motor module assembly, motor coupling unit and pump assembly each have a rotatable shaft that combine together to form a continuous rotatable shaft that runs through the concatenated pump system.

A power conductor communicates electrical power via a first electrical connector to the first motor while a second electrical connection communicates power to the second motor. The second electrical connection is connected to the motor coupling unit so that the frequency and voltage communicated to the second motor is altered according to the rotational speed of the shaft driven by the first motor, thereby adjusting the speed of the pump assembly driven by the first motor module assembly and the second motor module assembly.

The objects, advantages and features of the present invention will become clear from the following detailed description and drawings when read in conjunction with the appended claims.

DESCRIPTION

Figure 1:
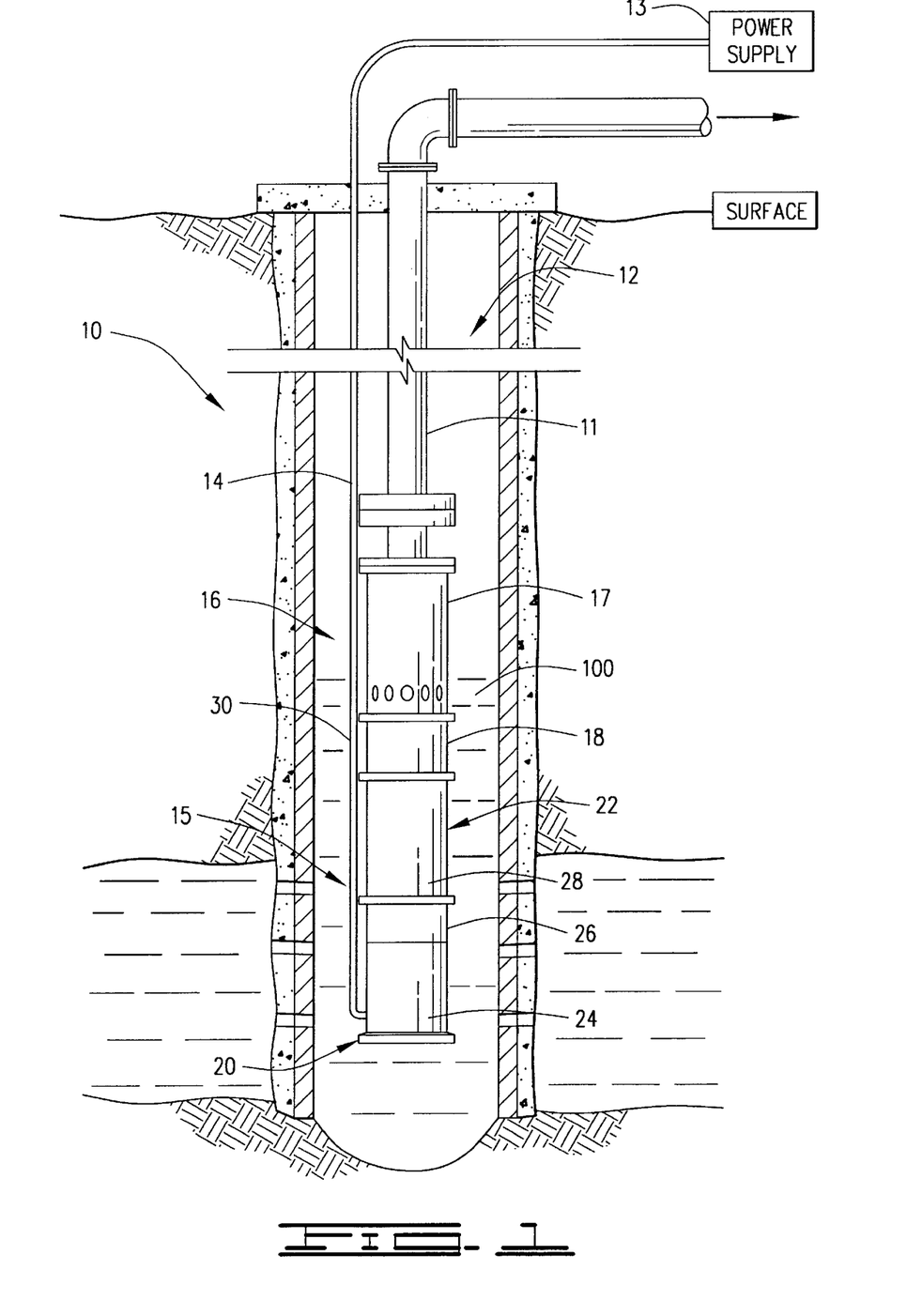
FIG. 1 is a side elevational diagram, in partial cross-section, of an electrical submersible pumping system constructed in accordance with the present invention.

Referring to the drawings in general and particularly to FIG. 1, depicted therein is a submersible concatenated pump system 10 constructed in accordance with the present invention. While the present invention will be described in relation to the embodiment shown in the appended drawings, it will be understood that the present invention can be adapted to other embodiments.

The concatenated pump system 10 is connected to a production tubing string 11 and supported thereby in a well-bore 12 and includes a power supply 13 supplying power through a power cable 14 to a concatenated motor assembly 15 used to drive a pump assembly 16. The pump assembly 16 includes a pump 17 and a seal assembly 18 attached to the concatenated motor assembly 15. The concatenated motor assembly 15 has a primary or control concatenation unit 20 and a secondary concatenation unit 22.

Figure 2:
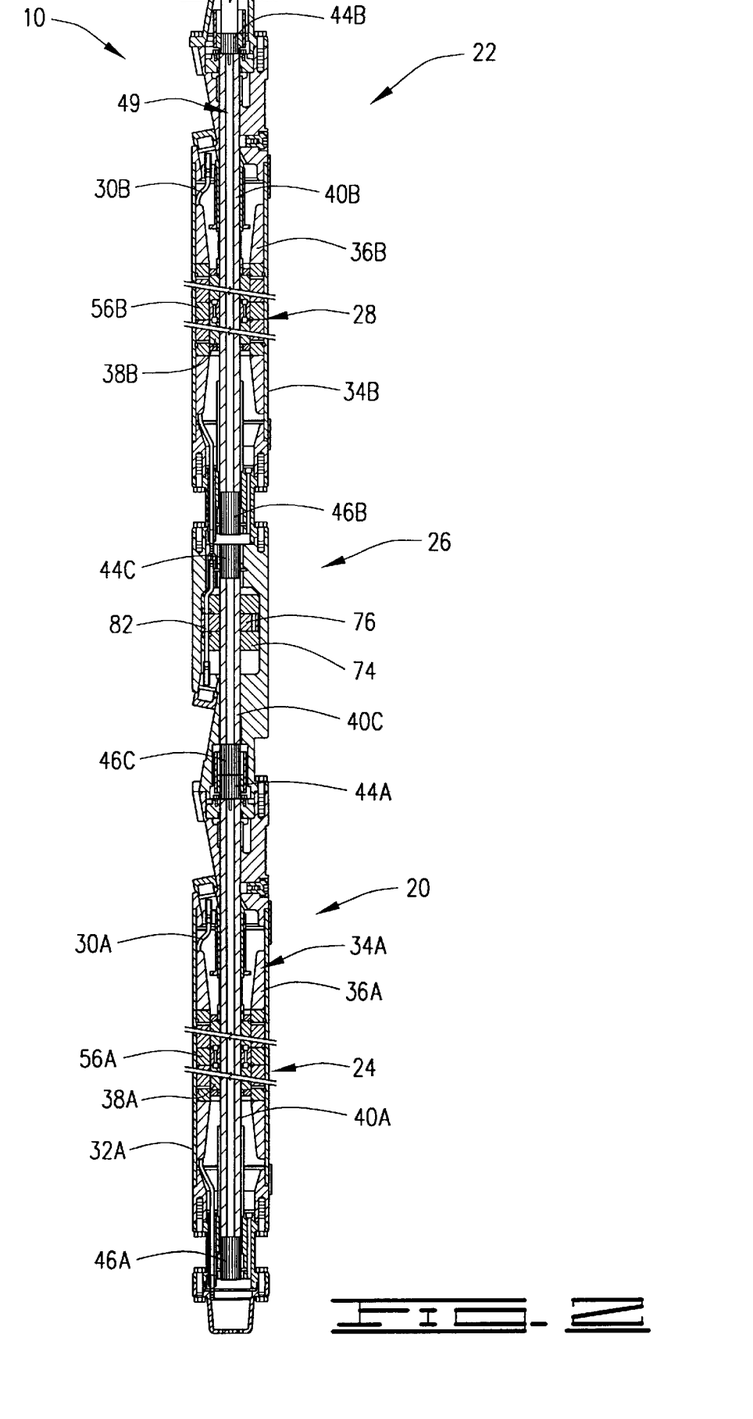
FIG. 2 is a longitudinal cross section of the submersible concatenated motor assembly of FIG. 1.

As shown by FIG. 2, the primary concatenation unit 20 comprises a first motor module assembly 24 connected to a motor coupling unit 26, while the secondary concatenation unit 22 includes a second motor module assembly 28 coupled to the motor coupling unit 26. Optionally, the coupling unit 26 may be integrated with and made part of the first motor module assembly 24. In either case, the coupling unit 26 provides both the mechanical and the electrical connection between the primary concatenation unit 20 and the secondary contatenation unit 22. For the parts that are similar between the motor module assembly 24, the coupling unit 26 and the motor module assembly 28, the numbering convention will be designated by a common numeric character accompanied by the alpha character 'A' for the first motor module 24, the alpha character 'B' for the second motor module 28, and the alpha character 'C' for the motor coupling unit 26. In a preferred embodiment, the power supply 13 (of FIG. 1) supplies power to the primary concatenation unit 20 via the power cable 14 to a first power connection 30A for application to the first motor module 24.

Figure 3:
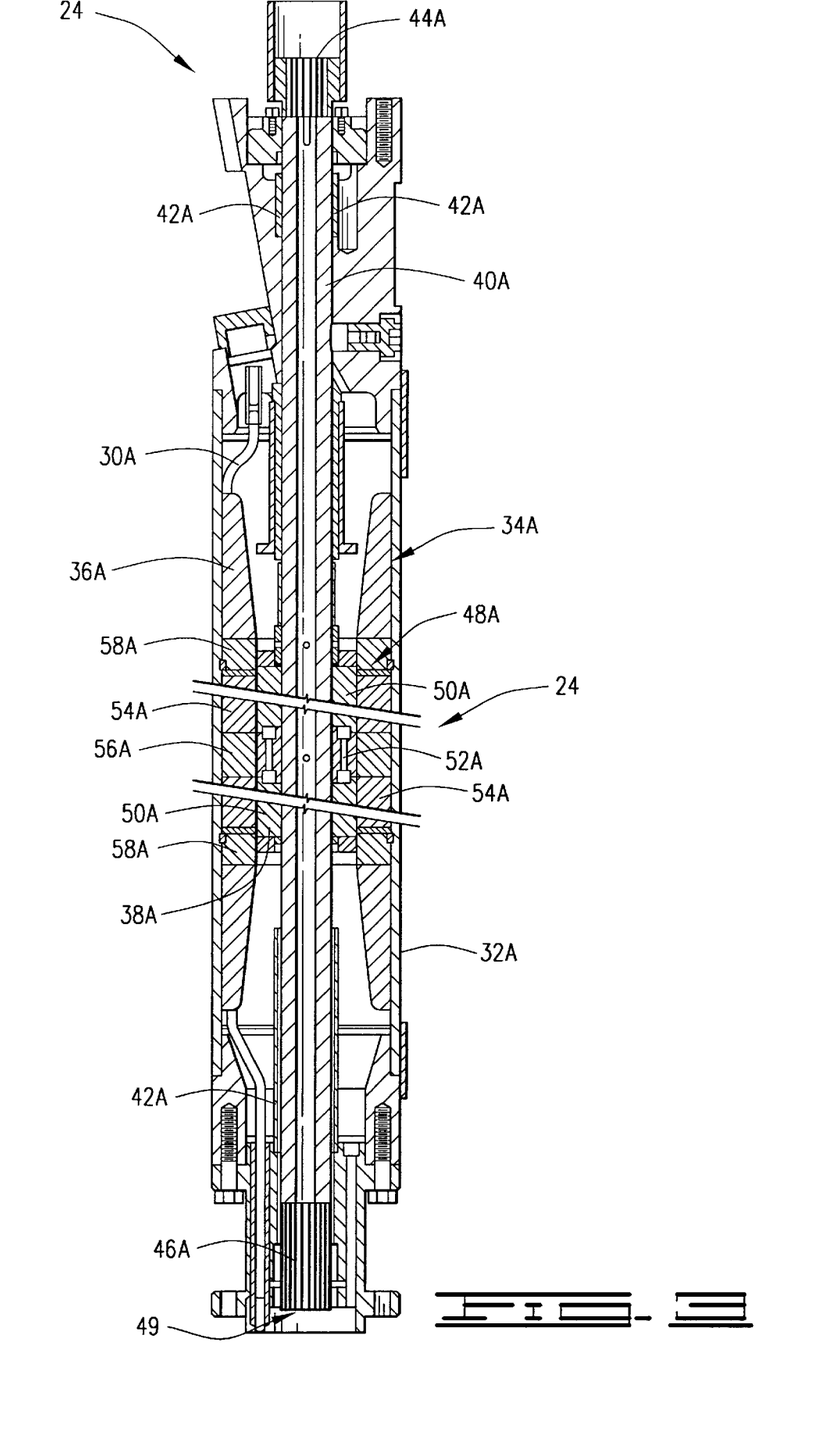
FIG. 3 is a longitudinal cross section, cutaway view of one of the motor assemblies of FIG. 1.

Shown in greater detail by FIG. 3, the first motor module assembly 24 includes an elongated motor housing 32A enclosing a wound rotor induction motor 34A. The wound rotor induction motor 34A includes a stator portion 36A adjacent the elongated motor housing 32A and a rotatable wound rotor portion 38A adjacent the stator portion 36A. A rotatable shaft section 40A is supported by a pair of bearing assemblies 42A, which in turn supports the wound rotor portion 38A. The pair of bearing assemblies 42A are secured in place by the elongated housing 32A. The rotatable shaft section 40A includes a first spline 44A for use in Tinkling the first motor module assembly 24 to the coupling unit 26 and a second spline 46A for use in linking the concatenated motor assembly 15 to additional concatenated motor assemblies of alternate embodiments.

In a preferred embodiment, the wound rotor induction motor 34A is a three phase induction motor. As such, the stator portion 36A is a three phase, Y-connected motor with three pairs of windings spaced 120° apart (not shown separately) that respond to applied voltages that have a 120-degree phase displacement. Applying three-phase power to the windings of the stator portion 36A sets up a rotating magnetic field. Similar to the stator portion 36A, the wound rotor portion 38A has three pairs of Y-connected windings spaced 120° complimentary to the three pair of windings of the stator portion 36A. The rotating magnetic field of the stator portion 36A induces a magnetic field in the wound rotor portion 38A by cutting through the three pairs of Y-connected windings resulting in an induced Electro-Magnetic Force (emf). The two fields interact and cause the wound rotor portion 38A to turn in the direction of the rotating magnetic field of the stator portion 36A and relative to the elongated motor housing 32A. The current developed in the windings of wound rotor portion 38A of the induction motor 34A is passed to the coupling unit 26, which collects the current and provides power to a stator portion 36B of a second induction motor 34B as shown in FIG. 2. The frequency of the three phase power supplied to the second induction motor is determined by the frequency of the power supplied to the first induction motor 34A and the rotational speed of the wound rotor portion 38A relative to the stator portion 36A.

Returning to FIG. 2, the coupling unit 26 includes a rotatable shaft section 40C with a first spline 44C and a second spline 46C while the second motor module 28 includes a rotatable shaft section 40B with a first spline 44B and a second spline 46B. Collectively, the rotatable shaft sections 40A, 40B and 40C combine to form a continuous rotatable shaft 49 via a coupling between their respective splines, i.e., spline 44A coupled with spline 46C, and spline 44C coupled with spline 46B.

Figure 4:
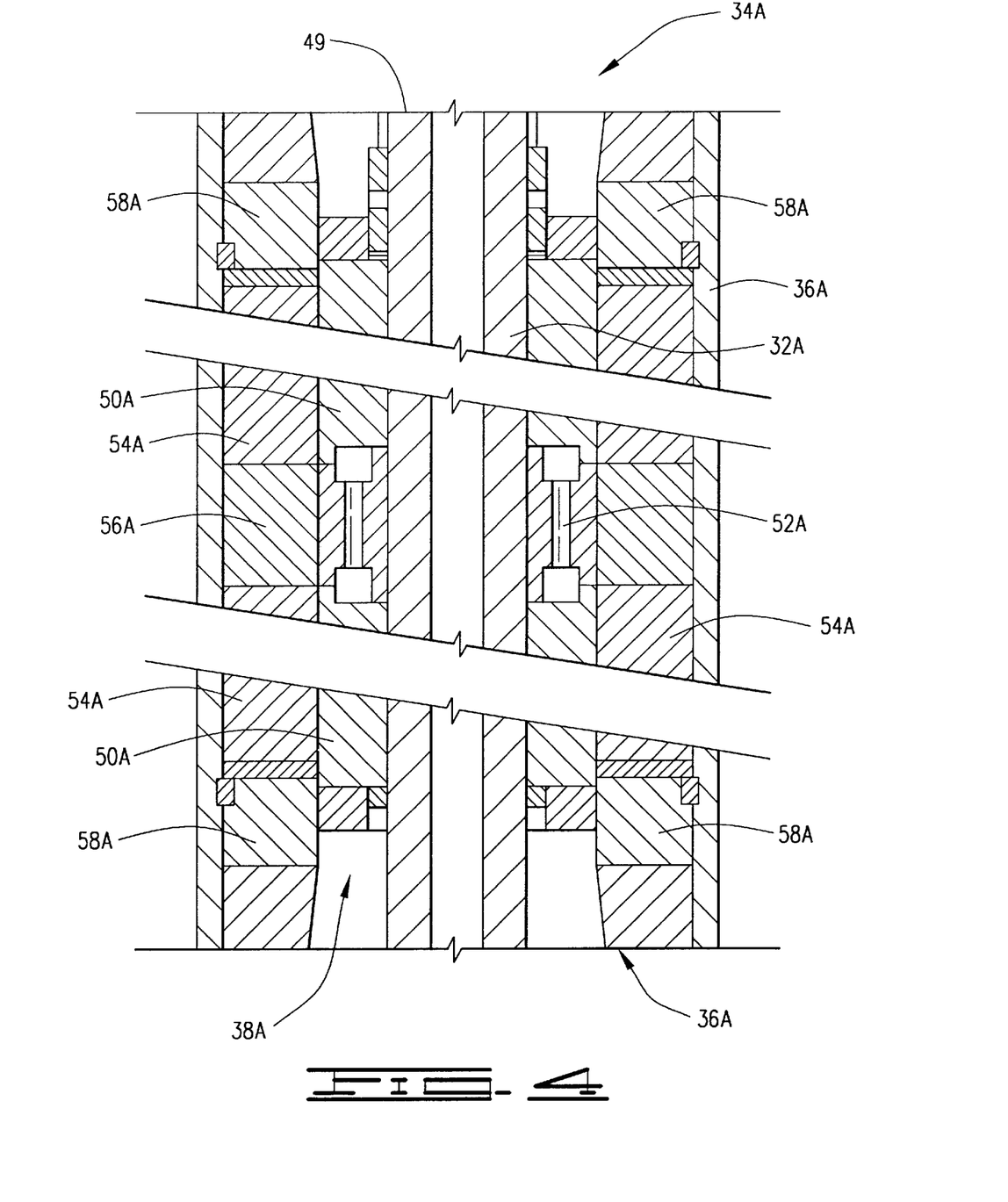
FIG. 4 is an enlarged cross section of a portion of the motor of FIG. 3.

The wound rotor induction motor 34A, a portion of which is shown in FIG. 4, shows the cylindrically shaped rotor portion 38A, attached to the continuous rotatable shaft 49 of the concatenated pump system 10, which rotates within the cylindrically shaped stator portion 36A. The rotor portion 38A is made up of a series of rotor segments 50A separated by oil bearings 52A. The stator portion 36A is made up of steel laminations 54A and brass laminations 56A including a series of stator windings 58A running through the laminations that are coupled to the power conductor 30A, causing rotation of the rotor portion 38A within the wound rotor induction motor 34A, in a manner well known in the art. As will be appreciated by those skilled in the art, stator windings 58A will typically be wound and connected in groups depending upon the design of the stator portion 36A, the number of poles in the wound rotor induction motor 34A, and the desired speed of the wound rotor induction motor 34A. In a preferred embodiment the second motor module 28 has substantially the same construction as the first motor module 24 described above. However, the second motor module 28 having substantially the same construction as the first motor module 24 is not a limitation on the scope of the invention. Dissimilar construction of the second motor module 28 relative to the first motor module 24, for example an induction motor absent a wound rotor portion, is embodied within the scope of the present invention.

Figure 5:
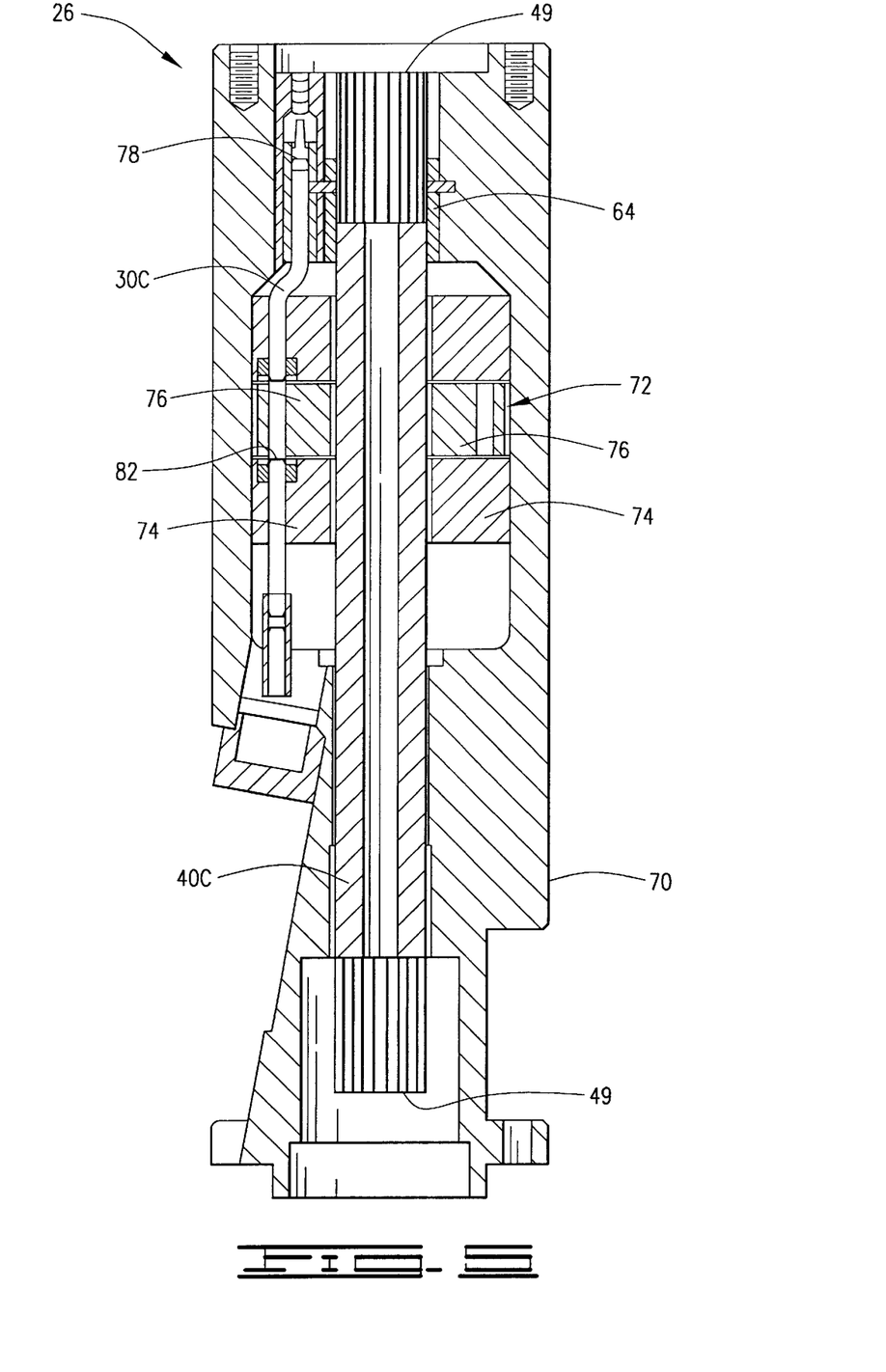
FIG. 5 is a cutaway view of the motor coupling unit of FIG. 2.

The concatenated pump system 10 has the motor coupling unit 26, shown in FIG. 5, which along with the first motor module assembly 24 forms the control concatenation unit 20, also referred to herein as a primary concatenation unit 20, as shown in FIG.2. The motor coupling unit 26 includes bearings 64 disposed between the rotatable shaft sections 40C of the continuous rotatable shaft 49 and an elongated coupling housing 70. Included in the motor coupling unit 26 is a portion referred to as slips 72. The slips 72, as shown in FIG. 5, have two parts; the stationary outer slips (stator) 74, serve to collect the current developed in the windings of wound rotor portion 38A of the induction motor 34A, and provide the collected current as power to the stator portion 36B of the second induction motor 34B, while the inner slips (rotor) 76, which rotate within the outer slips 74, serve to receive the current developed in the windings of wound rotor portion 38A of the induction motor 34A.

In a preferred embodiment, the slips 72 have a construction similar to the induction motor 34A wherein the inner slips 76 are built in a manner similar to the rotor portion 38A and the outer slips 74 are built in a manner similar to that of the stator portion 36A, including a series of windings running through the outer slips 74, in a manner well known in the art. As will be appreciated by those skilled in the art, these windings will typically be wound and connected in groups depending upon the design of the motor coupling unit 26.

The inner slips 76 are connected to the continuous rotatable shaft 49, thereby causing the inner slips 76 to rotate at the same rotational velocity as the wound rotor portion 38A of the induction motor 34A during operation of the concatenated pump system 10. The outer slips 74 are connected to the second motor module 28 through a connector 78. The inner slips 76 rotate past the outer slips 74 at the slip ring connector 82.

Figure 6:
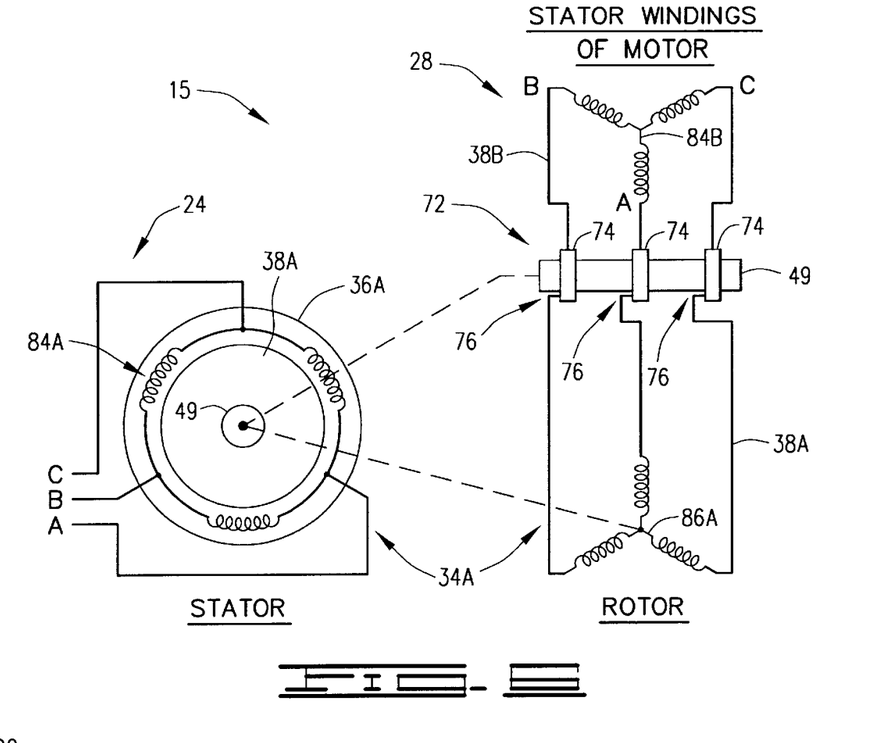
FIG. 6 is a schematic diagram of the electrical motor circuit showing the connections between the two motors of FIG. 1.

FIG. 6 is a schematic of a preferred embodiment of the concatenated motor assembly 15. The stator portion 36A of the induction motor 34A shows that windings 84A are three phase, Y-connected pairs of windings spaced 120° apart. The windings 84A are responsive to applied voltages that have a 120-degree phase displacement. Likewise, the rotor portion 38A of the induction motor 34A shows that windings 86A are three phase, Y-connected pairs of windings spaced 120° apart. The windings 86A respond to a rotating magnetic field, developed when current is applied to the stator portion 36A of the induction motor 34A. The response of the windings 86A to the rotating magnetic field cutting through the windings 86A is a generation of a current. The current generated has a frequency offset from the frequency of the current supplied to the stator portion 36A, is modulated by the rotational speed of the continuous rotatable shaft 49, and has a voltage phase substantially the same, with a slight time shift, as the phase of the voltage supplied to the stator portion 36A.

The first rotor portion 38A is mechanically connected to the inner slips 76 via the continuous rotatable shaft 49. The rotation of the inner slips 76 relative to the outer slips 74 induces a power output from the slips 72 used to power stator windings 84B of induction motor 34B of the second motor module 28 that is frequency dependent on the rotational speed of the continuous rotatable shaft 49. This use of concatenation creates the concatenated motor assembly 15 displaying a resultant "third motor" response which can have properties different from each individual induction motor, such as 34A and 34B. The resultant third motor response of the concatenated motor assembly 15, for instance, can achieve the effect of additional poles for the concatenated pump system 10, thus allowing the concatenated motor assembly 15 to achieve the equivalent of a larger number of poles than is physically present in the individual induction motors, such as 34A and 34B.

The operation of the concatenated pump system 10 will be described with reference to FIGS. 6 through 8. As described above, a concatenated pump system 10 is formed when the shafts of two or more motors are connected in series to form a continuous rotatable shaft 49 as shown in FIG. 6. In the present concatenated motor assembly 15, the variable speed results from the unique use of slips 72 and resultant change in frequency applied to the second motor module 28. This change results in the system taking on different performance characteristics than any of the individual motor modules of the originally designed unit. The resultant speed of the concatenated motor assembly 15 is inversely proportional to the sum or difference of the number of poles in the concatenated motors. If the synchronous speed of a two pole motor is 3600 rpm on 60 hertz (Hz) power, then the synchronous speed of a four pole motor is 1800 rpm. The speed of an eight pole motor is 900 rpm, and the speed of a twelve pole motor is 600 rpm. If the concatenated motor system has two motors and one has four poles and the other has eight poles, the resultant "third motor" or concatenated motor assembly 15 could run at 1800 rpm (4+0) or 900 rpm (8+0) or 600 rpm (8+4). It could also run in the reverse direction at a speed of 1800 rpm (8−4).

This effectively allows different pole configurations and different windings to be combined in the same concatenated pump system 10 by using the resultant slip of the slips 72 in the motor coupling unit 26. This is preferable because the effective speeds and resultant torque that can be obtained using concatenated motor assembly 15 are sufficient to power a progressive cavity pump at the higher horsepower and torques required, absent the use of a gearbox.

The progressive cavity (PC) pump 17, as shown in FIG. 1, is connected to the second motor module 28 via the seal assembly 18. The second motor module 28 is in turn connected to the first motor module 24 via the motor coupling unit 26. The first motor module 24 and the motor coupling unit 26 collectively form the control concatenation unit 20. The output response of the first motor module 24 coupled to the second motor module 28 via the motor coupling unit 26 work together to produce the resultant equivalent "third motor" discussed above. If the concatenated motor assembly 15 for the PC pump 17 has two motors with a synchronous speed of 3600 rpm on 60 hertz (Hz), one motor with twelve poles and the other with eight poles, then the resultant equivalent "third motor" could run at a slow speed of 360 rpm (8+12 poles) with high torque or at a faster speed with low torque such as 600 rpm (12+0 poles) or 900 rpm (8+0 poles). These are speeds within the range of those shown in FIG. 7, which are those for a typical PC pump, such as PC pump 17.

Figure 7:
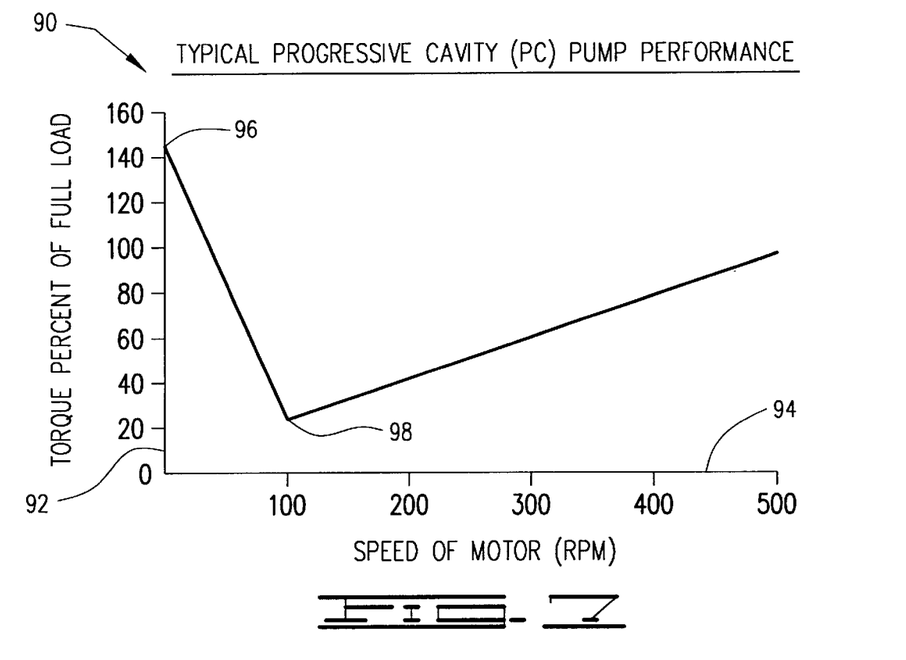
FIG. 7 is a graph of typical, actual torque versus motor speed for a typical progressive cavity pump.

FIG. 7 shows a curve 90 of torque as a percentage of full load versus motor speed for a typical Progressive Cavity (PC) pump. On the x-axis 92 is plotted the torque as a percentage of full load and on the y-axis 94 is plotted the corresponding motor speed (rpm). These speeds typically range from 100 to 800 rpm for the PC pump and require high initial torques. At start-up the torque can be nearly 145% of the running torque as shown at 96. In contrast, the torque at 100 rpm is typically much lower as shown at 98. The concatenated motor assembly 15 can operate at these speeds and torques with a particular combination of motors in the control concatenation unit 20 and the secondary concatenation unit 22 as described above.

The operation of the concatenated pump system 10 can be further explained with reference to FIG. 8, which is a flow chart of the steps necessary to pump fluids using the concatenated pump system 10. It should be noted that, in general, this is a submersible system but it could be used as a surface system, or a combination of both. It should also be noted that the diagrams imply a vertically disposed well-bore but in most circumstances the well-bore will have an incline. As shown in FIG. 1, the motor module assembly 28 of the secondary concatenation unit 22 rotates the combined continuous rotatable shaft 49 that rotates the pump 17, such as a progressive cavity pump, and moves produced fluids 100, such as oil and gas, from the producing formation via the pump 17 to the surface. The rotational speed of the continuous rotatable shaft 49 is influenced by the control catenation unit 20 through the motor coupling unit 26.

Figure 8:
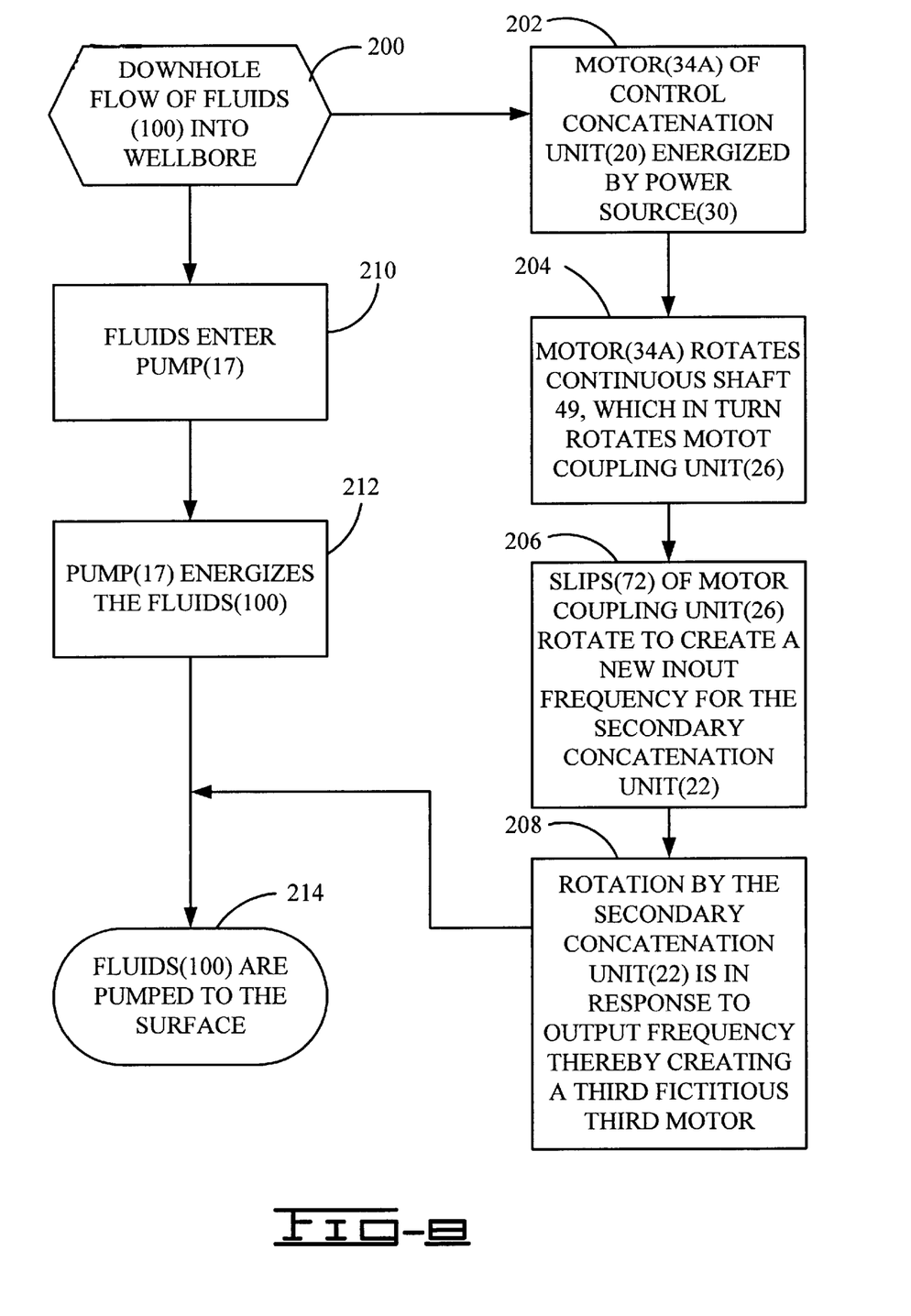
FIG. 8 is a flow chart of the sequence of operation of the electrical submersible pumping system depicted in FIG. 1.

When fluids 100 are in the well-bore, ready to be pumped to the surface, as shown by step 200, the wound rotor induction motor 34A of the control concatenation unit 20 is energized by the power cable 14 through a power connection 30A as shown by step 202 of FIG. 8, the wound rotor induction motor 34A rotates the continuous rotatable shaft 49 of the motor coupling unit 26 as shown by step 204. At step 206, the direct mechanical linkage from the first wound rotor induction motor 34A drives the inner slips (rotor) 76 creating an electromagnetic coupling to the outer slips (stator) 74. As shown in step 208, the output from the slips 72 provides the power input to the stator 36B of the second induction motor 34B thus the two induction motors 34A and 34B exhibit properties of a resultant equivalent third motor as described above, thus powering the pump 17 at the appropriate speed to operate without additional controls. At step 210 fluids 100 enter the pump 17. At step 212 the pump 17 energizes the fluids 100 and at step 212, the fluids are pumped to the surface.

The present invention is well adapted to attain the ends and advantages mentioned as well as those inherent therein. While a presently preferred embodiment has been described for purposes of this disclosure, numerous changes may be made which will readily suggest themselves to one skilled in the art and which are encompassed in the spirit of the invention disclosed and as defined in the appended claims.

What is claimed is:

1. A system for pumping fluid from a well-bore, comprising:
    a continuous rotatable shaft;
    a pump assembly driven by a rotation of the continuous rotatable shaft pumping fluid from the well-bore;
    a first motor module assembly generating an induced current while rotating the continuous rotatable shaft to drive the pump assembly;
    a motor coupling unit coupled to the first motor module assembly providing power in response to the induced current; and
    a second motor module assembly electrically connected to the motor coupling unit consuming the provided power to further drive the pump assembly by further rotating the continuous shaft to pump the fluid from the well-bore.

2. The system of claim 1, wherein the system is submersible.

3. The system of claim 1, in which the first motor module comprises a number of first poles, the second motor module comprises a number of second poles and in which the number of first poles differs from the number of second poles.

4. The system of claim 1, in which the first motor module assembly comprises an induction motor with a wound rotor.

5. The system of claim 1, in which the pump assembly comprises a progressive cavity pump.

6. The system of claim 1, wherein the second motor module is directly coupled to the motor coupling unit.

7. The system of claim 1, wherein the generated induced current is electrical power derived from rotation of the first motor module assembly, and wherein the derived electrical power is the provided power consumed by the second motor module assembly to further drive the pump assembly by further rotating the continuous shaft to pump the fluid from the well-bore is used to power the second motor module.

8. A system for pumping fluid from a well-bore, comprising:
    a continuous rotatable shaft;
    a pump assembly driven by a rotation of the continuous rotatable shaft pumping fluid from the well-bore;
    a first motor module assembly having a first elongated housing forming a first central bore supporting a first power connection while confining a first motor having a first bearing assembly contiguous the first central bore supporting the continuous rotatable shaft, the continuous rotatable shaft attached to a first rotatable rotor encompassed by a first stator restrained within the first bore of the first elongated housing, the first motor module assembly generating an induced current while rotating the continuous rotatable shaft to drive the pump assembly;
    a motor coupling unit coupled to the first motor module assembly providing power in response to the induced current; and
    a second motor module assembly having a second elongated housing forming a second central bore supporting a second power connection while confining a second motor having a second bearing assembly contiguous the second central bore supporting the continuous rotatable shaft, the continuous rotatable shaft attached to a second rotatable rotor encompassed by a second stator restrained within the second bore of the second elongated housing, the second motor module assembly electrically connected to the motor coupling unit consuming the provided power to further drive the pump assembly by further rotating the continuous shaft to pump the fluid from the well-bore.

9. A system for pumping fluid from a well-bore, comprising:
    a continuous rotatable shaft;
    a pump assembly driven by a rotation of the continuous rotatable shaft pumping fluid from the well-bore;
    first motor module assembly generating an induced current while rotating the continuous rotatable shaft to drive the pump assembly;
    a motor coupling unit having an elongated housing forming a central bore supporting a slip connector while confining a bearing assembly contiguous the central bore supporting the continuous rotatable shaft, the continuous rotatable shaft attached to rotatable inner slips encompassed by fixed outer slips restrained within the bore of the elongated housing, the slip connector connecting a power connection to the inner slips, the motor coupling unit coupled to the first motor module assembly providing power in response to the induced current; and
    a second motor module assembly electrically connected to the motor coupling unit consuming the provided power to further drive the pump assembly by further rotating the continuous shaft to pump the fluid from the well-bore.

10. The system of claim 9, further comprising a power supply external the well-bore supplying power to the first motor module assembly.

11. The system of claim 10, in which the power supply supplies power to the first motor module assembly through an electrical power cable connected between the power supply and the first motor module assembly.

12. The system of claim 9, in which the first motor module comprises at least one motor.

13. The system of claim 9, in which the second motor module comprises at least one motor.

14. A pump system comprising:

a pump assembly;

a first motor module assembly driving the pump assembly; and a second motor module assembly communicating with the first motor module assembly further driving the pump assembly, the second motor module assembly powered by means for powering the second motor module assembly.

* * * * *

UNITED STATES PATENT AND TRADEMARK OFFICE
CERTIFICATE OF CORRECTION

PATENT NO.     : 6,468,058 B1
DATED          : October 22, 2002
INVENTOR(S)    : Stephen M. Breit and O Howard Glaze It is certified that error appears in the above-identified patent and that said Letters Patent is hereby corrected as shown below:

<u>Title page, Item [54], and Column 1, line 1,</u>
Title, "SUBMERSIBLE CONCATENATED SYSTEM" should be --
SUBMERSIBLE CONCATENATED PUMP SYSTEM --

Signed and Sealed this

Thirteenth Day of July, 2004

JON W. DUDAS
*Acting Director of the United States Patent and Trademark Office*